US010850838B2

(12) United States Patent
Castleman et al.

(10) Patent No.: US 10,850,838 B2
(45) Date of Patent: Dec. 1, 2020

(54) UAV BATTERY FORM FACTOR AND INSERTION/EJECTION METHODOLOGIES

(71) Applicant: SONY INTERACTIVE ENTERTAINMENT INC., Tokyo (JP)

(72) Inventors: Dennis Dale Castleman, Fremont, CA (US); Ruxin Chen, Redwood City, CA (US); Frank Zhao, San Mateo, CA (US); Glenn Black, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 643 days.

(21) Appl. No.: 15/394,473

(22) Filed: Dec. 29, 2016

(65) Prior Publication Data
US 2018/0093768 A1 Apr. 5, 2018

Related U.S. Application Data

(60) Provisional application No. 62/402,467, filed on Sep. 30, 2016.

(51) Int. Cl.
*B64C 39/00* (2006.01)
*B64C 39/02* (2006.01)

(52) U.S. Cl.
CPC ...... *B64C 39/024* (2013.01); *B64C 2201/042* (2013.01); *B64C 2201/108* (2013.01)

(58) Field of Classification Search
CPC .............................. B64C 39/24; B64C 2201/42
See application file for complete search history.

(56) References Cited

U.S. PATENT DOCUMENTS

| 3,279,863 A | 10/1966 | Zuppiger |
| 3,367,658 A | 2/1968 | Bayha |
| 6,021,646 A | 2/2000 | Burley et al. |
| 6,075,924 A | 6/2000 | Will |
| 6,236,365 B1 | 5/2001 | LeBlanc et al. |
| 6,254,394 B1 | 7/2001 | Draper et al. |
| 7,912,742 B2 | 3/2011 | Trautman |
| 7,975,774 B2 | 7/2011 | Akcasu |
| 7,988,154 B1 | 8/2011 | Regan, Jr. |

(Continued)

FOREIGN PATENT DOCUMENTS

WO  WO 2018/063594  4/2018

OTHER PUBLICATIONS

PCT Application No. PCT/US2017/048064 International Preliminary Report on Patentability dated Apr. 2, 2019.

(Continued)

*Primary Examiner* — J. Woodrow Eldred
(74) *Attorney, Agent, or Firm* — Polsinelli LLP

(57) ABSTRACT

The present disclosure is related to unmanned aerial vehicles or drones that have a capability of quickly swapping batteries. This may be accomplished even as the drone continues to fly. A drone consistent with the present disclosure may drop one battery and pickup another using an attachment mechanism. Attachment mechanisms of the present disclosure may include electro-magnets, mechanical actuators, pins, or hooks. Systems consistent with the present disclosure may also include locations where replacement batteries may be provided to aircraft via actuation devices coupled to a physical location.

16 Claims, 10 Drawing Sheets

(56) References Cited

U.S. PATENT DOCUMENTS

| | | |
|---|---|---|
| 8,025,293 B1 | 9/2011 | Crawford et al. |
| 8,909,391 B1 | 12/2014 | Peeters et al. |
| 9,061,102 B2 | 6/2015 | Levien et al. |
| 9,218,316 B2 | 12/2015 | Bernstein et al. |
| 9,442,485 B1 | 9/2016 | McDermott et al. |
| 9,605,926 B1 | 3/2017 | Means et al. |
| 9,632,502 B1 | 4/2017 | Levinson et al. |
| 9,927,812 B2 | 3/2018 | Wang et al. |
| 10,062,292 B2 | 8/2018 | Blomberg et al. |
| 10,067,736 B2 | 9/2018 | Taylor |
| 10,137,984 B1 | 11/2018 | Flick |
| 10,210,905 B2 | 2/2019 | Castleman |
| 10,248,118 B2 | 4/2019 | Bernstein et al. |
| 10,336,469 B2 | 7/2019 | Mallinson |
| 10,357,709 B2 | 7/2019 | Mallinson |
| 10,377,484 B2 | 8/2019 | Taylor |
| 10,410,320 B2 | 9/2019 | Taylor |
| 10,416,669 B2 | 9/2019 | Rico |
| 10,500,487 B2 | 12/2019 | Gutierrez et al. |
| 2003/0102016 A1 | 6/2003 | Bouchard |
| 2003/0152892 A1 | 8/2003 | Huang et al. |
| 2004/0008253 A1 | 1/2004 | Monroe |
| 2004/0115593 A1 | 6/2004 | Hatlestad et al. |
| 2004/0172187 A1 | 9/2004 | Wiseman |
| 2005/0004723 A1 | 1/2005 | Duggan et al. |
| 2005/0283281 A1 | 12/2005 | Hartmann et al. |
| 2006/0095262 A1 | 5/2006 | Danielli |
| 2006/0169508 A1 | 8/2006 | Trojahn |
| 2007/0061116 A1 | 3/2007 | Bush |
| 2007/0102876 A1 | 5/2007 | Giegerich et al. |
| 2007/0130599 A1 | 6/2007 | Monroe |
| 2008/0073839 A1 | 3/2008 | Nally |
| 2008/0093796 A1 | 4/2008 | Narus et al. |
| 2008/0144884 A1 | 6/2008 | Habibi |
| 2008/0154447 A1 | 6/2008 | Spinelli |
| 2008/0177994 A1 | 7/2008 | Mayer |
| 2008/0221745 A1 | 9/2008 | Diamandis et al. |
| 2008/0232602 A1 | 9/2008 | Shearer |
| 2009/0005167 A1 | 1/2009 | Arrasvuori et al. |
| 2009/0076665 A1 | 3/2009 | Hoisington et al. |
| 2009/0087029 A1 | 4/2009 | Coleman et al. |
| 2009/0118896 A1 | 5/2009 | Gustafsson |
| 2009/0125163 A1 | 5/2009 | Duggan et al. |
| 2009/0187389 A1 | 7/2009 | Dobbins et al. |
| 2009/0265105 A1 | 10/2009 | Davis et al. |
| 2010/0083038 A1 | 4/2010 | Pierce et al. |
| 2010/0096491 A1 | 4/2010 | Whitelaw et al. |
| 2010/0121574 A1 | 5/2010 | Ariyur et al. |
| 2010/0228468 A1 | 9/2010 | D'Angelo |
| 2010/0305724 A1 | 12/2010 | Fry et al. |
| 2011/0102459 A1 | 5/2011 | Hall |
| 2011/0106339 A1 | 5/2011 | Phillips et al. |
| 2011/0184590 A1 | 7/2011 | Duggan et al. |
| 2011/0199376 A1 | 8/2011 | Salemane |
| 2011/0311949 A1 | 12/2011 | Preston et al. |
| 2012/0009845 A1 | 1/2012 | Schmelzer |
| 2012/0035799 A1 | 2/2012 | Ehrmann |
| 2012/0093320 A1 | 4/2012 | Flaks et al. |
| 2012/0188078 A1 | 7/2012 | Soles et al. |
| 2012/0206452 A1 | 8/2012 | Geisner et al. |
| 2012/0212399 A1 | 8/2012 | Border et al. |
| 2012/0232867 A1 | 9/2012 | Ahrens et al. |
| 2013/0128054 A1 | 5/2013 | Densham et al. |
| 2013/0137066 A1 | 5/2013 | Pollak et al. |
| 2013/0173089 A1 | 7/2013 | Bernstein et al. |
| 2013/0328927 A1 | 12/2013 | Mount et al. |
| 2013/0345910 A1 | 12/2013 | Kerho et al. |
| 2014/0018979 A1 | 1/2014 | Goossen et al. |
| 2014/0244075 A1 | 8/2014 | Litwinowicz et al. |
| 2014/0324253 A1 | 10/2014 | Duggan et al. |
| 2014/0356670 A1* | 12/2014 | Haug .................. B60L 3/0046 |
| | | 429/90 |
| 2015/0063610 A1 | 3/2015 | Mossner |
| 2015/0135144 A1 | 5/2015 | Kim |
| 2015/0141100 A1 | 5/2015 | Carter |
| 2015/0209659 A1 | 7/2015 | Barr et al. |
| 2015/0248785 A1 | 9/2015 | Holmquist |
| 2015/0323931 A1 | 11/2015 | Downey et al. |
| 2015/0346722 A1 | 12/2015 | Herz et al. |
| 2015/0370250 A1 | 12/2015 | Bachrach et al. |
| 2015/0378019 A1 | 12/2015 | Schissler et al. |
| 2016/0035224 A1 | 2/2016 | Yang et al. |
| 2016/0078759 A1 | 3/2016 | Nerayoff et al. |
| 2016/0082597 A1 | 3/2016 | Gorshechnikov et al. |
| 2016/0091894 A1 | 3/2016 | Zhang et al. |
| 2016/0111006 A1 | 4/2016 | Srivastava et al. |
| 2016/0117853 A1 | 4/2016 | Zhong et al. |
| 2016/0117931 A1 | 4/2016 | Chan et al. |
| 2016/0144734 A1* | 5/2016 | Wang .................. B60L 11/1822 |
| | | 701/17 |
| 2016/0196754 A1 | 7/2016 | Surace |
| 2016/0205654 A1 | 7/2016 | Robinson |
| 2016/0217698 A1 | 7/2016 | Liu et al. |
| 2016/0246474 A1 | 8/2016 | Shuster |
| 2016/0253908 A1 | 9/2016 | Chambers et al. |
| 2016/0257001 A1 | 9/2016 | Blasdel et al. |
| 2016/0284125 A1 | 9/2016 | Bostick et al. |
| 2016/0291593 A1 | 10/2016 | Hammond et al. |
| 2016/0292924 A1 | 10/2016 | Balachandreswaran et al. |
| 2016/0299506 A1 | 10/2016 | Bruggeman et al. |
| 2016/0307447 A1 | 10/2016 | Johnson et al. |
| 2016/0327950 A1 | 11/2016 | Bachrach et al. |
| 2016/0330601 A1 | 11/2016 | Srivastava |
| 2016/0358497 A1 | 12/2016 | Nguyen et al. |
| 2017/0036771 A1 | 2/2017 | Woodman et al. |
| 2017/0039859 A1 | 2/2017 | Hu et al. |
| 2017/0045886 A1 | 2/2017 | Liu et al. |
| 2017/0053169 A1 | 2/2017 | Cuban et al. |
| 2017/0061813 A1 | 3/2017 | Tao et al. |
| 2017/0069214 A1 | 3/2017 | Dupray et al. |
| 2017/0098947 A1* | 4/2017 | Wolski ................. H01M 2/1044 |
| 2017/0116723 A1 | 4/2017 | Aughey |
| 2017/0158353 A1 | 6/2017 | Schmick |
| 2017/0165575 A1 | 6/2017 | Ridihalgh et al. |
| 2017/0166204 A1 | 6/2017 | Yoo et al. |
| 2017/0168488 A1 | 6/2017 | Wierzynski et al. |
| 2017/0168556 A1 | 6/2017 | Goslin et al. |
| 2017/0173451 A1 | 6/2017 | Pedersen et al. |
| 2017/0182407 A1 | 6/2017 | Steele et al. |
| 2017/0244775 A1 | 8/2017 | Ha et al. |
| 2017/0251323 A1 | 8/2017 | Jo et al. |
| 2017/0283090 A1* | 10/2017 | Miller .................. B64C 39/024 |
| 2017/0295446 A1 | 10/2017 | Thagadur |
| 2017/0329347 A1 | 11/2017 | Passot et al. |
| 2017/0337826 A1 | 11/2017 | Moran et al. |
| 2017/0343375 A1 | 11/2017 | Kamhi et al. |
| 2017/0371353 A1 | 12/2017 | Millinger |
| 2017/0372617 A1 | 12/2017 | Bruno et al. |
| 2018/0322699 A1 | 1/2018 | Gray et al. |
| 2018/0027772 A1 | 2/2018 | Gordon et al. |
| 2018/0032071 A1 | 2/2018 | Wieneke |
| 2018/0039262 A1 | 2/2018 | Fox et al. |
| 2018/0046187 A1 | 2/2018 | Martirosyan et al. |
| 2018/0046560 A1 | 2/2018 | Gillies et al. |
| 2018/0093171 A1 | 4/2018 | Mallinson |
| 2018/0093781 A1 | 4/2018 | Mallinson |
| 2018/0094931 A1 | 4/2018 | Taylor |
| 2018/0095433 A1 | 4/2018 | Rico |
| 2018/0095461 A1 | 4/2018 | Taylor |
| 2018/0095463 A1 | 4/2018 | Castleman |
| 2018/0095714 A1 | 4/2018 | Taylor |
| 2018/0096455 A1 | 4/2018 | Taylor |
| 2018/0096611 A1 | 4/2018 | Kikuchi |
| 2018/0098052 A1 | 4/2018 | Black |
| 2018/0144525 A1 | 5/2018 | Gutierrez et al. |
| 2018/0213359 A1 | 7/2018 | Reinhardt et al. |
| 2018/0246514 A1 | 8/2018 | Mitomo et al. |
| 2018/0259339 A1 | 9/2018 | Johnson et al. |
| 2018/0321692 A1 | 11/2018 | Castillo-Effen et al. |
| 2018/0329413 A1 | 11/2018 | Charalambides et al. |
| 2019/0019329 A1 | 1/2019 | Eyler et al. |
| 2019/0047700 A1 | 2/2019 | Liu et al. |
| 2019/0075252 A1 | 3/2019 | Zhao et al. |
| 2019/0079722 A1 | 3/2019 | Taylor |

(56) References Cited

U.S. PATENT DOCUMENTS

2019/0156563 A1 5/2019 Wada
2019/0156573 A1 5/2019 Palos et al.
2019/0311548 A1 10/2019 Wang et al.

OTHER PUBLICATIONS

U.S. Appl. No. 15/394,267 Final Office Action dated Apr. 19, 2019.
U.S. Appl. No. 16/121,441 Office Action dated May 15, 2019.
U.S. Appl. No. 15/393,855 Final Office Action dated May 17, 2019.
Fujii, Katsuya; Higuchi, Keita; Rekimoto, Jun; "Endless Flyer: A Continuous Flying Drone with Automatic Battery Replacement", 2013 IEEE 10th International Conference on Ubiquitous Intelligence & Computing and 2013 IEEE 10th International Conference on Autonomic & Trusted Computing, pp. 216-223.
U.S. Appl. No. 15/394,391 Office Action dated Feb. 23, 2018.
U.S. Appl. No. 15/393,855 Office Action dated May 16, 2018.
PCT Application No. PCT/US2017/048064 International Search Report and Written Opinion dated Nov. 7, 2017.
U.S. Appl. No. 15/394,313 Office Action dated Oct. 18, 2017.
Thon S, Serena-Allier D, Salvetat C, Lacotte F.; "Flying a dron in a museum an augmented-reality serious game in a Provence", InDigital Heritage International Congress (DigitalHeritage), Oct. 28, 2013 (vol. 2, pp. 669-676), IEEE. (Year: 2013).
Bai, Z., Blackwell, A., Coulouris, G.; Using augmented reality to elicit pretend play for children with autism. IEEE Transactions on Visualization & Computer Graphics. May 1, 2015(1):1.
U.S. Appl. No. 15/394,329 Final Office Action dated Feb. 25, 2019.
U.S. Appl. No. 15/394,285 Final Office Action dated Feb. 26, 2019.
U.S. Appl. No. 15/393,855 Office Action dated Feb. 1, 2019.
U.S. Appl. No. 16/121,441, Michael Taylor, Proximity Based Noise and Chat, filed Sep. 4, 2018.
U.S. Appl. No. 15/394,391 Office Action dated Aug. 24, 2018.
U.S. Appl. No. 15/394,329 Office Action dated Aug. 7, 2018.
U.S. Appl. No. 15/394,267 Office Action dated Aug. 24, 2018.
U.S. Appl. No. 15/394,285 Office Action dated Aug. 3, 2018.
U.S. Appl. No. 15/393,855 Final Office Action dated Oct. 12, 2018.
U.S. Appl. No. 15/711,695 Office Action dated Oct. 5, 2018.
U.S. Appl. No. 15/711,961 Office Action dated Oct. 5, 2018.
Williams, Elliot; "Real-life Space Invaders with Drones and Lasers," Hackaday, Sep. 19, 2016.
U.S. Appl. No. 15/394,511, Michael Taylor, Course Profiling and Sharing, filed Dec. 29, 2016.
U.S. Appl. No. 15/394,391, Dennis D. Castleman, Remote Controlled Object Macro and Autopilot System, filed Dec. 29, 2016.
U.S. Appl. No. 15/394,329, Javier F. Rico, Mechanical Effects by Way of Software or Real World Engagement, filed Dec. 29, 2016.
U.S. Appl. No. 15/394,267, Megumi Kikuchi, Collision Detection and Avoidance, filed Dec. 29, 2016.
U.S. Appl. No. 15/394,285, Michael Taylor, Steering Assist, filed Dec. 29, 2016.
U.S. Appl. No. 15/394,313, Michael Taylor, Proximity Based Noise and Chat, filed Dec. 29, 2016.
U.S. Appl. No. 15/393,855, Glenn Black, Translation of Physical Object Viewed by Unmanned Aerial Vehicle Into Virtual World Object, filed Dec. 29, 2016.
U.S. Appl. No. 15/393,875, Michael Taylor, UAV Positional Anchors, filed Dec. 29, 2016.
U.S. Appl. No. 16/121,441 Office Action dated Feb. 19, 2020.
U.S. Appl. No. 15/711,695, Dominic S. Mallinson, Unmanned Aerial Vehicle Movement via Environmental Airflow, filed Sep. 21, 2017.
U.S. Appl. No. 15/711,961, Dominic S. Mallinson, Unmanned Aerial Vehicle Movement via Environmental Interactions, filed Sep. 21, 2017.
U.S. Appl. No. 16/121,441 Final Office Action dated Sep. 6, 2019.

* cited by examiner

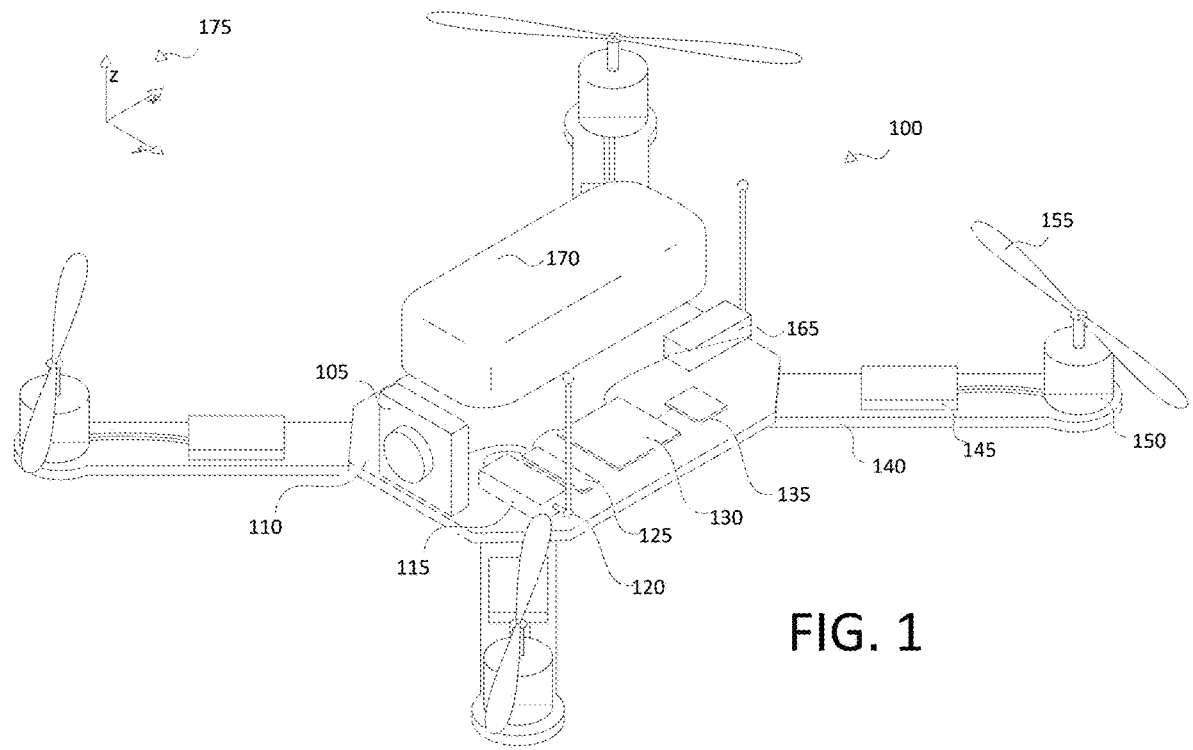
FIG. 1
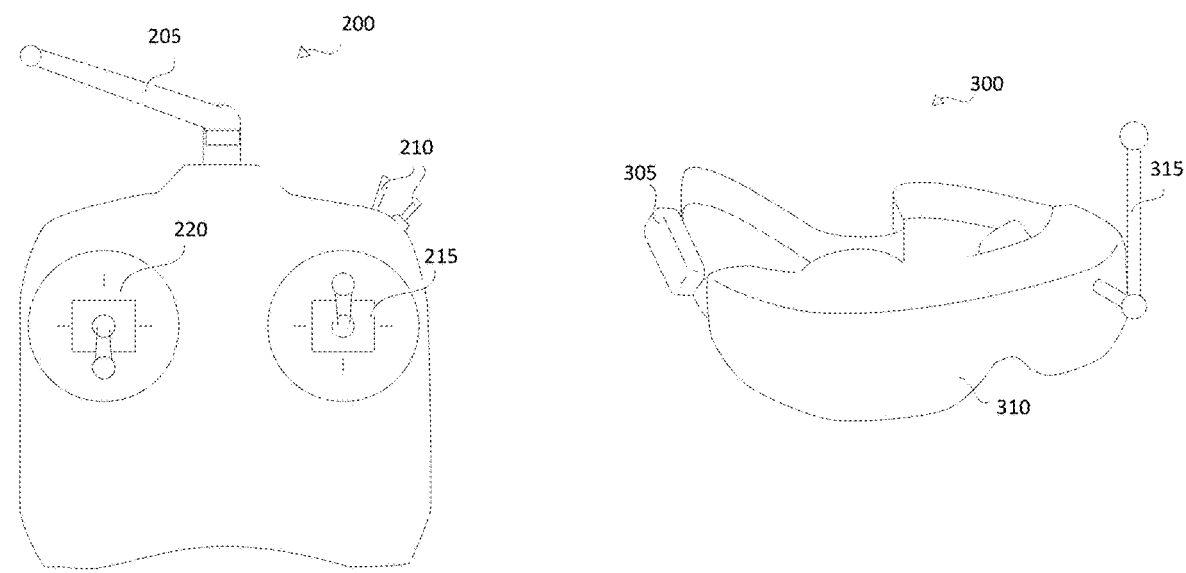
FIG. 2
FIG. 3

UAV BATTERY FORM FACTOR AND INSERTION/EJECTION METHODOLOGIES

CROSS-REFERENCE TO RELATED APPLICATIONS

The present application claims priority benefit of U.S. provisional patent application 62/402,467 filed on Sep. 30, 2016, the disclosure of which is incorporated herein by reference.

BACKGROUND OF THE INVENTION

Field of the Invention

The present disclosure is generally related to swapping power cells quickly. More specifically, the present Disclosure includes methods and systems for swapping batteries automatically.

Description of the Related Art

Today the skies are becoming more and more crowded with autonomous and remotely controlled flying devices. Such apparatus are commonly referred to as drones or unmanned aerial vehicles (UAVs). While some drones use solar power or are configured to collect energy from a laser, these types of energy collection techniques suffer from various deficiencies including, yet not limited to: low efficiency of converting sunlight into electricity; slow battery charge rates; and a loss of line of sight between a laser and a drone. As such, many more drones today are powered by batteries that have to be exchanged before they are completely discharged.

Batteries, also suffer from limitations that relate to the fact that batteries have limited power storage capacities, batteries are heavy, and flying drones consume energy rapidly. The combined limitations relating to batteries storing a limited amount of power and the high energy consumption rates of drones mean that drones frequently have to swap a nearly depleted batter with a freshly charged battery so they may continue flying. As such, drones are like humming birds, they must frequently seek out an energy source so they can continue flying. Unlike humming birds, however, drones cannot re-fuel simply by sucking nectar from nearby flowers while in flight. Instead, drones must stop (i.e. park) when they require a fresh battery.

While some automated systems have been developed where a drone may park near a robotic battery swapping apparatus, battery swapping apparatus developed so far are very slow (they can take nearly a minute to swap a battery). In the future, demands for swapping batteries more quickly will become needed. This demand is driven by both commercial need and sporting need. For example, those that rely on drones to continually watch a desired area cannot perform this function efficiently because the amount of time required to swap batteries is excessive. In another example, drones that are used in races cannot be optimally competitive when minutes are wasted swapping batteries.

What are needed are systems, apparatus, and methods that enable autonomous and/or remotely controlled machines, such as drones, to swap batteries very quickly. What are also needed are batteries that are designed to be swapped quickly and batteries that store increasing amounts of energy for a given weight.

SUMMARY OF THE PRESENTLY CLAIMED INVENTION

The presently claimed invention includes systems and methods for rapidly swapping batteries powering a drone. Methods of the presently claimed invention may be implemented via a non-transitory computer readable storage medium, where a processor executes program code out of a memory.

A system consistent with the presently claimed invention includes an unmanned aircraft that carries a battery using an attachment mechanism. When preparing to swap a battery, an unmanned aircraft may approach a location where a replacement battery is located. The aircraft may then release the battery that it has been carrying by releasing it via the attachment mechanism before that battery is fully depleted. After the aircraft has released the battery that it has been carrying, it may pick up a replacement battery using the attachment mechanism.

A method consistent with the presently claimed invention includes an unmanned aircraft that carries a battery using an attachment mechanism. When preparing to swap a battery, the aircraft may approach a location where a replacement battery is located. The aircraft may then release the battery that it has been carrying by releasing it via the attachment mechanism before. After the aircraft has released the old battery, it may pick up a replacement battery using the attachment mechanism.

When the method of the presently claimed invention is implemented by a non-transitory computer readable storage medium, a processor executing instructions out of a memory may also be used as an unmanned aircraft approaches a location where a replacement battery is located. Here again, the aircraft may release a nearly depleted battery via an attachment mechanism, and the aircraft may then pick up a replacement battery using the attachment mechanism.

BRIEF DESCRIPTION OF THE DRAWINGS

FIG. 1 illustrates an exemplary unmanned aerial vehicle or drone according to the present disclosure.

FIG. 2 shows control transmitter according to some embodiments of the present disclosure.

FIG. 3 illustrates an exemplary display consistent with the present disclosure.

DETAILED DESCRIPTION

Figure 4:
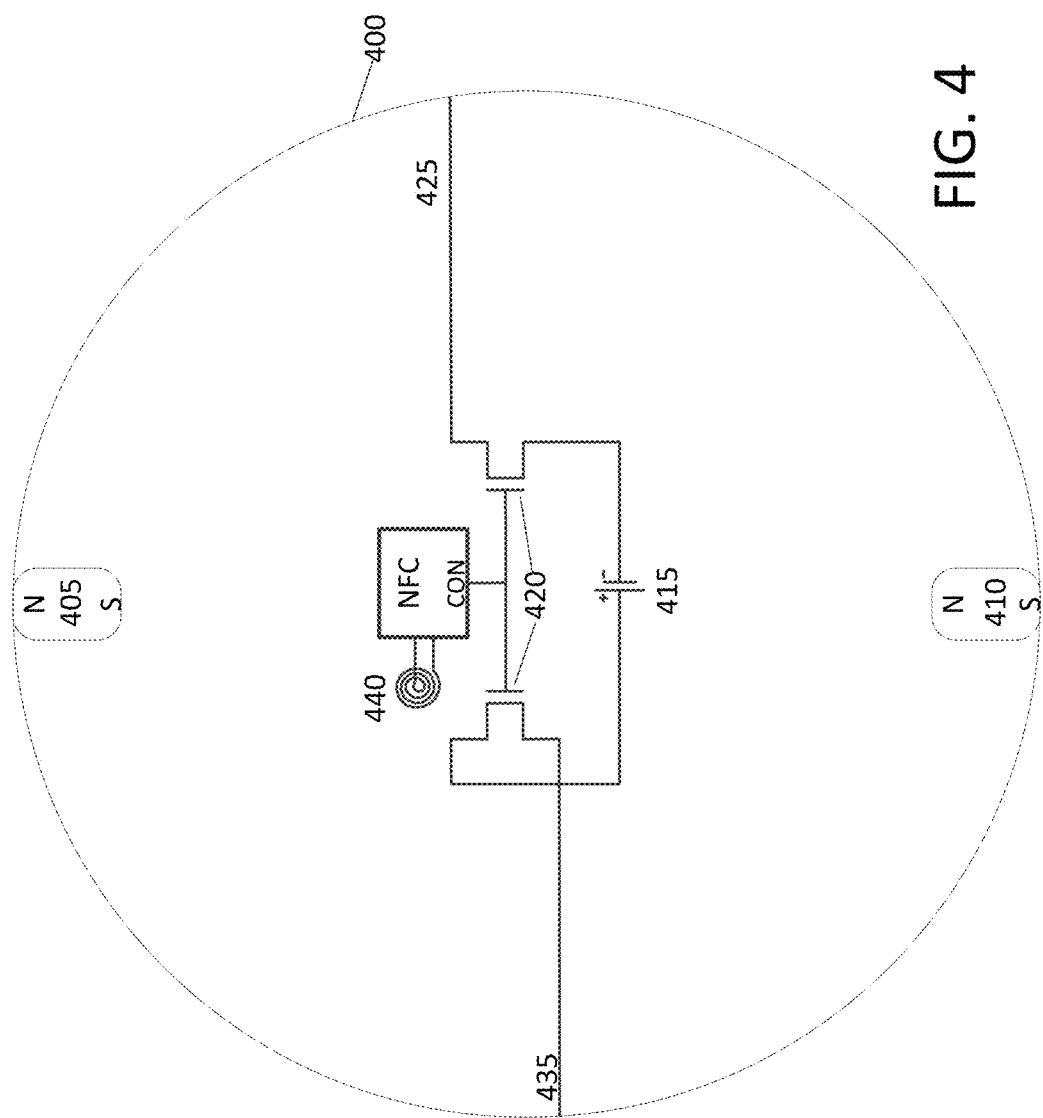
FIG. 4 illustrates an exemplary spherical battery consistent with the present disclosure.

The present disclosure describes systems and methods for exchanging batteries quickly. The present disclosure includes the use of batteries in various shapes that may be used with systems and methods consistent with the present disclosure.

FIG. 1 illustrates an exemplary unmanned aerial vehicle or drone according to the present disclosure. FIG. 1 shows unmanned aerial vehicle (UAV) 100 according to some embodiments. UAV 100 can have one or more motors 150 configured to rotate attached propellers 155 in order to control the position of UAV 100 in the air. UAV 100 can be configured as a fixed wing vehicle (e.g., airplane), a rotary vehicle (e.g., a helicopter or multirotor), or a blend of the two. For the purpose of FIG. 1, axes 175 can assist in the description of certain features. If UAV 100 is oriented parallel to the ground, the Z axis can be the axis perpendicular to the ground, the X axis can generally be the axis that passes through the bow and stern of UAV 100, and the Y axis can be the axis that pass through the port and starboard sides of UAV 100. Axes 175 are merely provided for convenience of the description herein.

In some embodiments, UAV 100 has main body 110 with one or more arms 140. The proximal end of arm 140 can attach to main body 110 while the distal end of arm 140 can secure motor 150. Arms 140 can be secured to main body 110 in an "X" configuration, an "H" configuration, a "T" configuration, or any other configuration as appropriate. The number of motors 150 can vary, for example there can be three motors 150 (e.g., a "tricopter"), four motors 150 (e.g., a "quadcopter"), eight motors (e.g., an "octocopter"), etc.

In some embodiments, each motor 155 rotates (i.e., the drive shaft of motor 155 spins) about parallel axes. For example, the thrust provided by all propellers 155 can be in the Z direction. Alternatively, a motor 155 can rotate about an axis that is perpendicular (or any angle that is not parallel) to the axis of rotation of another motor 155. For example, two motors 155 can be oriented to provide thrust in the Z direction (e.g., to be used in takeoff and landing) while two motors 155 can be oriented to provide thrust in the X direction (e.g., for normal flight). In some embodiments, UAV 100 can dynamically adjust the orientation of one or more of its motors 150 for vectored thrust. In some embodiments, the rotation of motors 150 can be configured to create or minimize gyroscopic forces. For example, if there are an even number of motors 150, then half of the motors can be configured to rotate counter-clockwise while the other half can be configured to rotate clockwise. Alternating the placement of clockwise and counter-clockwise motors can increase stability and enable UAV 100 to rotate about the z-axis by providing more power to one set of motors 150 (e.g., those that rotate clockwise) while providing less power to the remaining motors (e.g., those that rotate counter-clockwise).

Motors 150 can be any combination of electric motors, internal combustion engines, turbines, rockets, etc. In some embodiments, a single motor 150 can drive multiple thrust components (e.g., propellers 155) on different parts of UAV 100 using chains, cables, gear assemblies, hydraulics, tubing (e.g., to guide an exhaust stream used for thrust), etc. to transfer the power.

In some embodiments, motor 150 is a brushless motor and can be connected to electronic speed controller 145. Electronic speed controller 145 can determine the orientation of magnets attached to a drive shaft within motor 150 and, based on the orientation, power electromagnets within motor 150. For example, electronic speed controller 145 can have three wires connected to motor 150, and electronic speed controller 145 can provide three phases of power to the electromagnets to spin the drive shaft in motor 150. Electronic speed controller 145 can determine the orientation of the drive shaft based on back-emf on the wires or by directly sensing to position of the drive shaft.

Transceiver 165 can receive control signals from a control unit (e.g., a handheld control transmitter, a server, etc.). Transceiver 165 can receive the control signals directly from the control unit or through a network (e.g., a satellite, cellular, mesh, etc.). The control signals can be encrypted. In some embodiments, the control signals include multiple channels of data (e.g., "pitch," "yaw," "roll," "throttle," and auxiliary channels). The channels can be encoded using pulse-width-modulation or can be digital signals. In some embodiments, the control signals are received over TC/IP or similar networking stack.

In some embodiments, transceiver 165 can also transmit data to a control unit. Transceiver 165 can communicate with the control unit using lasers, light, ultrasonic, infra-red, Bluetooth, 802.11x, or similar communication methods, including a combination of methods. Transceiver can communicate with multiple control units at a time.

Position sensor 135 can include an inertial measurement unit for determining the acceleration and/or the angular rate of UAV 100, a GPS receiver for determining the geolocation and altitude of UAV 100, a magnetometer for determining the surrounding magnetic fields of UAV 100 (for informing the heading and orientation of UAV 100), a barometer for determining the altitude of UAV 100, etc. Position sensor 135 can include a land-speed sensor, an air-speed sensor, a celestial navigation sensor, etc. UAV 100 can have one or more environmental awareness sensors. These sensors can use sonar, LiDAR, stereoscopic imaging, computer vision, etc. to detect obstacles and determine the nearby environment. For example, a collision avoidance system can use environmental awareness sensors to determine how far away an obstacle is and, if necessary, change course.

Position sensor 135 and environmental awareness sensors can all be one unit or a collection of units. In some embodiments, some features of position sensor 135 and/or the environmental awareness sensors are embedded within flight controller 130.

In some embodiments, an environmental awareness system can take inputs from position sensors 135, environmental awareness sensors, databases (e.g., a predefined mapping of a region) to determine the location of UAV 100, obstacles, and pathways. In some embodiments, this environmental awareness system is located entirely on UAV 100, alternatively, some data processing can be performed external to UAV 100.

Camera 105 can include an image sensor (e.g., a CCD sensor, a CMOS sensor, etc.), a lens system, a processor, etc. The lens system can include multiple movable lenses that can be adjusted to manipulate the focal length and/or field of view (i.e., zoom) of the lens system. In some embodiments, camera 105 is part of a camera system which includes multiple cameras 105. For example, two cameras 105 can be used for stereoscopic imaging (e.g., for first person video, augmented reality, etc.). Another example includes one camera 105 that is optimized for detecting hue and saturation information and a second camera 105 that is optimized for detecting intensity information. In some embodiments, camera 105 optimized for low latency is used for control systems while a camera 105 optimized for quality is used for recording a video (e.g., a cinematic video). Camera 105 can be a visual light camera, an infrared camera, a depth camera, etc.

A gimbal and dampeners can help stabilize camera 105 and remove erratic rotations and translations of UAV 100. For example, a three-axis gimbal can have three stepper motors that are positioned based on a gyroscope reading in order to prevent erratic spinning and/or keep camera 105 level with the ground.

Video processor 125 can process a video signal from camera 105. For example video process 125 can enhance the image of the video signal, down-sample or up-sample the resolution of the video signal, add audio (captured by a microphone) to the video signal, overlay information (e.g., flight data from flight controller 130 and/or position sensor), convert the signal between forms or formats, etc.

Video transmitter 120 can receive a video signal from video processor 125 and transmit it using an attached antenna. The antenna can be a cloverleaf antenna or a linear antenna. In some embodiments, video transmitter 120 uses a different frequency or band than transceiver 165. In some embodiments, video transmitter 120 and transceiver 165 are part of a single transceiver.

Battery 170 can supply power to the components of UAV 100. A battery elimination circuit can convert the voltage from battery 170 to a desired voltage (e.g., convert 12 v from battery 170 to 5 v for flight controller 130). A battery elimination circuit can also filter the power in order to minimize noise in the power lines (e.g., to prevent interference in transceiver 165 and transceiver 120). Electronic speed controller 145 can contain a battery elimination circuit. For example, battery 170 can supply 12 volts to electronic speed controller 145 which can then provide 5 volts to flight controller 130. In some embodiments, a power distribution board can allow each electronic speed controller (and other devices) to connect directly to the battery.

In some embodiments, battery 170 is a multi-cell (e.g., 2S, 3S, 4S, etc.) lithium polymer battery. Battery 170 can also be a lithium-ion, lead-acid, nickel-cadmium, or alkaline battery. Other battery types and variants can be used as known in the art. Additional or alternative to battery 170, other energy sources can be used. For example, UAV 100 can use solar panels, wireless power transfer, a tethered power cable (e.g., from a ground station or another UAV 100), etc. In some embodiments, the other energy source can be utilized to charge battery 170 while in flight or on the ground.

Battery 170 can be securely mounted to main body 110. Alternatively, battery 170 can have a release mechanism. In some embodiments, battery 170 can be automatically replaced. For example, UAV 100 can land on a docking station and the docking station can automatically remove a discharged battery 170 and insert a charged battery 170. In some embodiments, UAV 100 can pass through docking station and replace battery 170 without stopping.

Battery 170 can include a temperature sensor for overload prevention. For example, when charging, the rate of charge can be thermally limited (the rate will decrease if the temperature exceeds a certain threshold). Similarly, the power delivery at electronic speed controllers 145 can be thermally limited—providing less power when the temperature exceeds a certain threshold. Battery 170 can include a charging and voltage protection circuit to safely charge battery 170 and prevent its voltage from going above or below a certain range.

UAV 100 can include a location transponder. For example, in a racing environment, race officials can track UAV 100 using location transponder. The actual location (e.g., X, Y, and Z) can be tracked using triangulation of the transponder. In some embodiments, gates or sensors in a track can determine if the location transponder has passed by or through the sensor or gate.

Flight controller 130 can communicate with electronic speed controller 145, battery 170, transceiver 165, video processor 125, position sensor 135, and/or any other component of UAV 100. In some embodiments, flight controller 130 can receive various inputs (including historical data) and calculate current flight characteristics. Flight characteristics can include an actual or predicted position, orientation, velocity, angular momentum, acceleration, battery capacity, temperature, etc. of UAV 100. Flight controller 130 can then take the control signals from transceiver 165 and calculate target flight characteristics. For example, target flight characteristics might include "rotate x degrees" or "go to this GPS location". Flight controller 130 can calculate response characteristics of UAV 100. Response characteristics can include how electronic speed controller 145, motor 150, propeller 155, etc. respond, or are expected to respond, to control signals from flight controller 130. Response characteristics can include an expectation for how UAV 100 as a system will respond to control signals from flight controller 130. For example, response characteristics can include a determination that one motor 150 is slightly weaker than other motors.

After calculating current flight characteristics, target flight characteristics, and response characteristics flight controller 130 can calculate optimized control signals to achieve the target flight characteristics. Various control systems can be implemented during these calculations. For example a proportional-integral-derivative (PID) can be used. In some embodiments, an open-loop control system (i.e., one that ignores current flight characteristics) can be used. In some embodiments, some of the functions of flight controller 130 are performed by a system external to UAV 100. For example, current flight characteristics can be sent to a server that returns the optimized control signals. Flight controller 130 can send the optimized control signals to electronic speed controllers 145 to control UAV 100.

In some embodiments, UAV 100 has various outputs that are not part of the flight control system. For example, UAV 100 can have a loudspeaker for communicating with people or other UAVs 100. Similarly, UAV 100 can have a flashlight or laser. The laser can be used to "tag" another UAV 100.

FIG. 2 shows control transmitter according to some embodiments of the present disclosure. Control transmitter 200 can send control signals to transceiver 165. Control transmitter can have auxiliary switches 210, joysticks 215 and 220, and antenna 205. Joystick 215 can be configured to send elevator and aileron control signals while joystick 220 can be configured to send throttle and rudder control signals (this is termed a mode 2 configuration). Alternatively, joystick 215 can be configured to send throttle and aileron control signals while joystick 220 can be configured to send elevator and rudder control signals (this is termed a mode 1 configuration). Auxiliary switches 210 can be configured to set options on control transmitter 200 or UAV 100. In some embodiments, control transmitter 200 receives information from a transceiver on UAV 100. For example, it can receive some current flight characteristics from UAV 100.

FIG. 3 illustrates an exemplary virtual reality display consistent with the present disclosure. Display 300 can include battery 305 or another power source, display screen 310, and receiver 315. Display 300 can receive a video stream from transmitter 120 from UAV 100. Display 300 can be a head-mounted unit as depicted in FIG. 3. Display 300 can be a monitor such that multiple viewers can view a single screen. In some embodiments, display screen 310 includes two screens, one for each eye; these screens can have separate signals for stereoscopic viewing. In some embodiments, receiver 315 is mounted on display 310 (as should in FIG. 3), alternatively, receiver 315 can be a separate unit that is connected using a wire to display 300. In some embodiments, display 300 is mounted on control transmitter 200.

In some instances a battery consistent with the present disclosure may be spherical. Batteries consistent with the present disclosure may also include magnets that help retain and/or align the battery properly. Drones themselves may include electromagnets that grab onto a battery as it is attached to an apparatus connected to a drone. In certain instances actuators built into a drone may position an electromagnet as the electromagnet grabs onto a battery. For example, clips/hooks that secure a battery into a drone may include a bi-metallic strip that straightens from curled position when heated by running an electric current through the bi-metallic strip. Batteries may also be secured into an apparatus by an actuator that may actuate a pin or grasping apparatus.

Of course, one key aspect of replacing a battery relates to removing a depleted or nearly depleted battery before a new battery is installed. If the battery in a drone is the only power source attached to the drone, removal of the battery may temporarily cause the drone to lose power. Because of this, apparatus consistent with the present disclosure would benefit by including a secondary power source. Secondary power sources that may be included in an apparatus include other batteries, super-capacitors, and contact points that may draw power from a power source not otherwise attached to a drone.

Super-capacitors and batteries have different characteristics. For example batteries charge rates are very slow. Unlike batteries, however, super-capacitors can be charged very quickly. Other characteristics consistent with batteries and super-capacitors relate to the rapidity of energy provision and the duration of energy provision. Batteries can provide moderately large amounts of energy for a significant amount of time, where super-capacitors can provide very large amounts of energy for (typically) a short amount of time. Of course these measures of time are relative to battery size and the total available capacitance of a super-capacitor. Yet another characteristic of batteries versus super-capacitors relates to mass (weight) versus energy capacity. Batteries tend to be very heavy as compared to super-capacitors.

Other aspects of the present disclosure relate to locations where a drone may land, approach, or hover over when swapping a battery. The more efficiently a drone may approach a replacement battery, the more efficiently a battery may be swapped. As such the design of a landing station that is compatible with a drone will tend to increase the speed of a battery swap process.

FIG. 4 illustrates an exemplary spherical battery consistent with the present disclosure. FIG. 4 includes spherical battery 400 that contains near field data communications circuit/controller NFC, antenna 440, field effect transistors (FET transistor pair) 420, battery 415, contacts 425 & 435, top magnet 405, and bottom magnet 410. In certain instances an electromagnet (not depicted in FIG. 4) at a drone may grab onto top magnet 405 when spherical battery 400 is picked up by the drone. After a battery is picked up by a drone, FET transistor pair 420 under the control of controller NFC may connect battery elements 425 & 435 to respective negative and positive terminals at battery 415 via control output connect (CON) of controller NFC. Antenna 440 may be a near field communication antenna used to communicate with a drone over a short distance. In other instances battery 400 may also include global positioning or cellular communication antennas.

Contacts 425 and 435 may connect to metallic contact point on each side of spherical battery 400. In certain instances, an entire hemisphere (or large portion of such) may include one or more contact points that may be controllable coupled to battery 415.

In an instance where battery 400 is disposed in an upside down orientation, where the south pole of batter 420 is pointed upward toward an with a south pole facing the south pole of magnet 410, repulsive magnetic forces may cause battery 400 to roll over, until the north pole of magnet 405 is pointed upward. As such magnetic forces may be used to orient and grab a battery when it is being installed.

Figure 5:
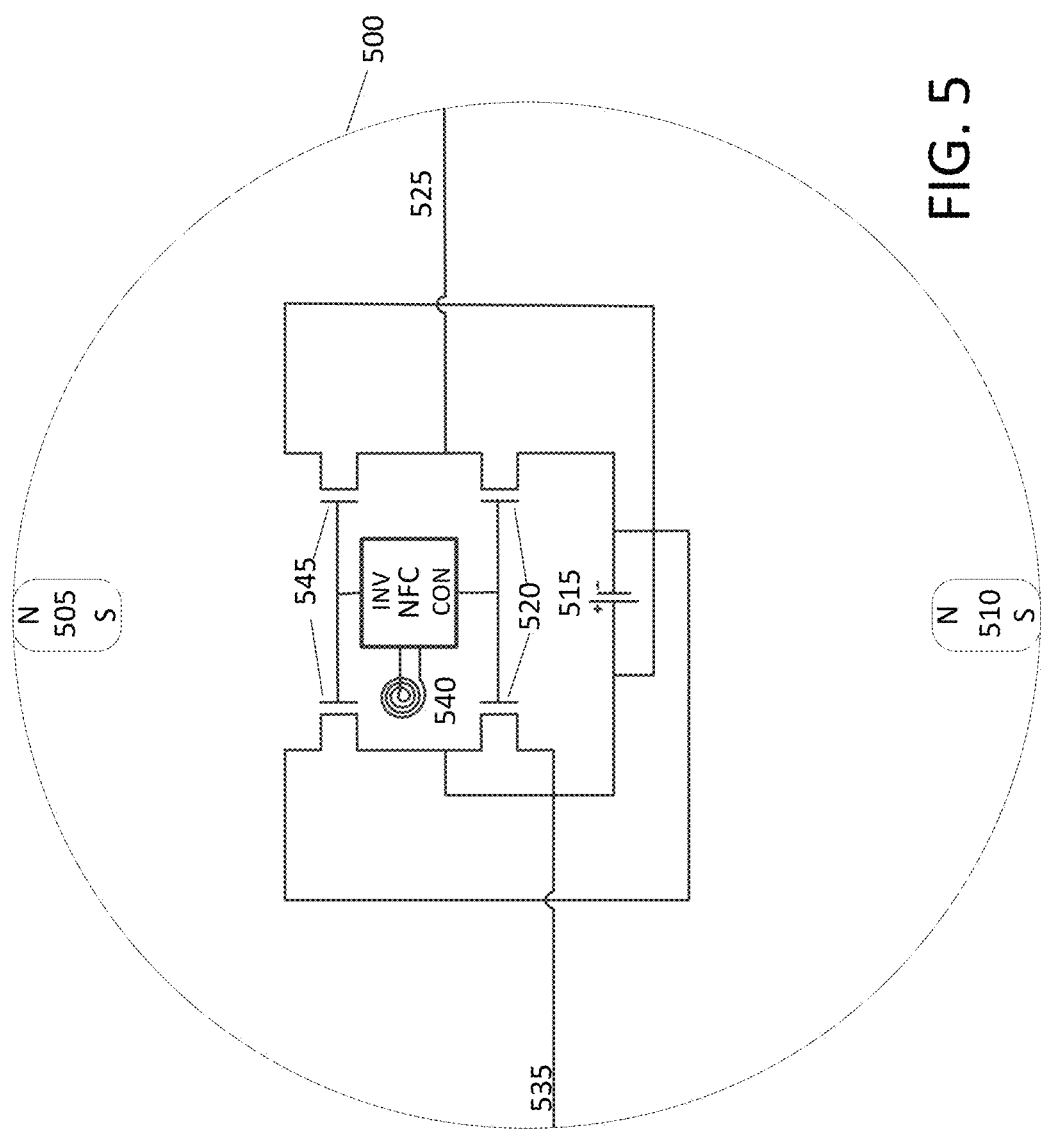
FIG. 5 illustrates a second exemplary spherical battery consistent with the present disclosure.

FIG. 5 illustrates a second exemplary spherical battery consistent with the present disclosure. FIG. 5 includes spherical battery 500 that contains controller/near field communication circuit NFC, antenna 540, field effect transistors (FET transistor pair) 520, FET transistor pair 545, battery 515, contacts 525 & 535, top magnet 505, and bottom magnet 510. In certain instances an electromagnet at a drone may grab onto top magnet 505 when spherical battery 500 is picked up by the drone. After a battery is picked up by a drone, FET transistor pair 520 under the control of controller NFC may connect battery elements 525 & 535 to respective negative − and positive + terminals at battery 515 via control output connect (CON) of controller NFC. Alternatively FET transistor pair 545 may connect battery contacts 525 and 535 to an appropriate terminal of battery 515 via control output invert (INV). Note that by including two different FET transistor pairs 520 & 545, a battery that is inserted "backward" (i.e. with its battery terminals in an inverse configuration) can have its battery connected to a drone with a proper (positive + and negative −) orientation.

In certain instances, the fact that a battery has been inserted in a backward configuration may be identified at a drone or at a battery. In one instance, when a battery has been inserted, yet current does not flow from the battery, FET transistor pairs may be used to invert battery terminal connections at a battery or at a drone. As such, battery orientation may be identified by monitoring current and by changing electrical connections.

In another instances, the orientation of a battery connection to a drone may be identified by monitoring voltages input to a drone. For example, voltage comparators at a drone may be used to identify that a battery is connected in a proper or inverted orientation. Discrete logic or a processor executing instructions out of a memory may cause transistors to switch power to an appropriate terminal of a battery.

Similarly, analog to digital converters coupled to a processor may monitor battery orientation and battery voltage at a drone or at a battery consistent with the present disclosure.

Here again antenna 540 may be a near field communication antenna used to communicate with a drone over a short distance. In other instances battery 500 may also include global positioning or cellular communication antennas.

Contacts 525 and 535 may connect to metallic contact point on each side of spherical battery 500. In certain instances, an entire hemisphere (or large portion of such) may include one or more contact points that may be controllable coupled to battery 515.

Figure 6A:
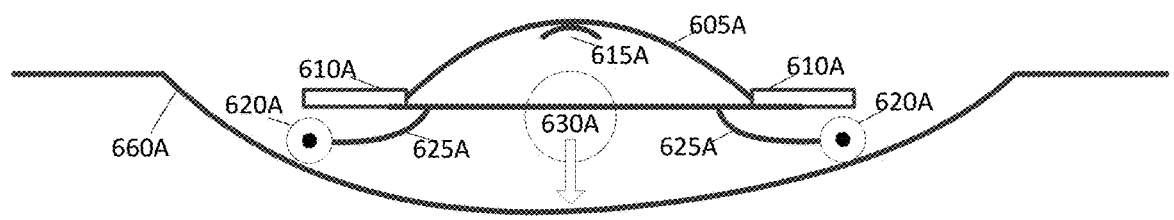
FIG. 6A illustrates an exemplary drone dropping a nearly exhausted battery just before a new battery is inserted into the drone.

FIG. 6A illustrates an exemplary drone dropping a nearly exhausted battery just before a new battery is inserted into the drone. FIG. 6A includes drone 605A that includes contacting mechanism/electromagnet 615A, wheels 620B, propulsion fans 620A, legs 625A, and battery 630A.

FIG. 6A also includes landing pad 660A that is concave in shape. The concave shape of landing pad 660A helps drone 610A center itself within landing pad 660A using gravity. As soon as a drone contacts landing surface 660A, the concave shape of landing surface 660A will cause drone 605A to roll or slide into place. As such, as soon as the wheels 620A of drone 605A contacts the concave portion of landing surface 660A, power to propulsion fans 660A may be limited or disconnected and gravity will allow drone 605A to be centered on landing surface 660A.

FIG. 6A also includes an apparatus that may be used to automatically swap battery 630A with battery 635A. Item 640A is a lever onto which battery 603A may be dropped by drone 605A. Pivot 645A allows lever 640 to rotate in a direction that directs battery 603A to be dropped into box 650A before battery 635A is placed into drone 605A by actuator stand 655A. Note that the arrow in FIG. 6A illustrates that battery 630A is moving toward landing surface 660A after being dropped by drone 605A. Landing surface may include a hole through which battery 630A is dropped onto lever 640A.

Drone 605A may drop battery 630A by releasing or more mechanisms. For example, an actuator may release a pin or hook (contact mechanism 615A) that holds a battery. Alternatively the power provided to an electromagnet holding the battery may be disconnected. In certain instances, battery mechanical contact mechanisms may be used in conjunction with electromagnets. For example, an electromagnet may be initially used to grab a battery and then another contact mechanism may physically engage with a physical contact point(s) at a battery. In such instances a hook at a drone may engage with a loop at the battery or a clamp at a drone may engage with a slot at a battery.

Figure 6B:
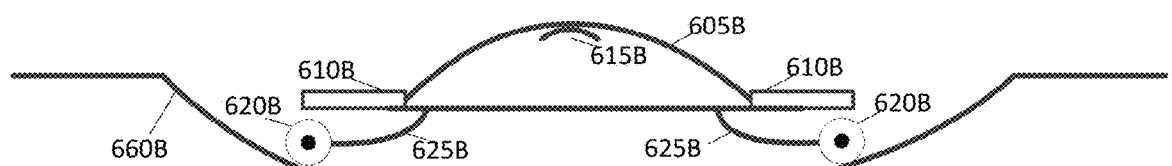
FIG. 6B illustrates the exemplary drone of FIG. 6A where the nearly exhausted battery is being directed into a storage repository.

FIG. 6B illustrates the exemplary drone of FIG. 6A where the nearly exhausted battery is being directed into a storage repository. FIG. 6B includes drone 605B that includes contacting mechanism/electromagnet 615B, wheels 620B, propulsion fans 620B, legs 625B, and battery 630B.

FIG. 6B also includes landing pad 660B that is concave in shape. The concave shape of landing pad 660B helps drone 610B center itself within landing pad 660B using gravity. As soon as a drone contacts landing surface 660B, the concave shape of landing surface 660B will cause drone 605B to roll or slide into place. As such, as soon as the wheels 620B of drone 605B contacts the concave portion of landing surface 660B, power to propulsion fans 660B may be reduces or disconnected and gravity will allow drone 605B to be centered on landing surface 660B.

FIG. 6B also includes an apparatus that may be used to automatically swap battery 630B with battery 635B. Item 640B is a lever onto which battery 603B may be dropped by drone 605B. Pivot 645B allows lever 640B to rotate in a direction that directs battery 603A to be dropped into box 650B before battery 635B is placed into drone 605B by actuator stand 655B. Note that the arrow in FIG. 6B illustrates that battery 630B is rolling/falling downward to the left toward after battery 630B has contacted lever 645B.

Note also that lever 640B has prevented battery 630B from continuing to fall directly down. This is because lever 640B may be restricted (by a pin, block, or other mechanism) that prevents lever 640B from rotating in a clockwise direction past the orientation illustrated in FIG. 6B. Because of this, battery 630B moves downward towards box 650B and past rotating member 645B.

Here again drone 605B may drop battery 630B by releasing or more mechanisms. For example, an actuator may release a pin or hook (contact mechanism 615B) that holds a battery or may disengage power to an electromagnet holding the battery such that the battery may be released. Mechanical battery retention mechanisms may be used in conjunction with electromagnets. For example, an electromagnet may be initially used to grab a battery, and then another contact mechanism may physically interconnect with a physical contact point(s) at a battery.

Figure 6C:
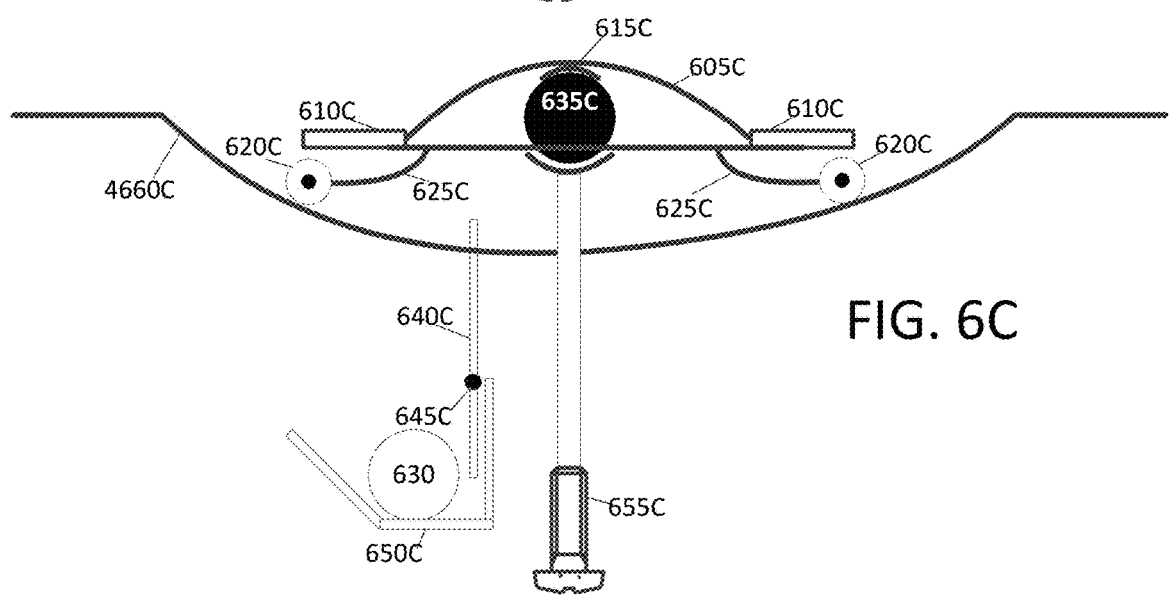
FIG. 6C illustrates the exemplary drone of FIGS. 6A & 6B as a replacement battery is connected to the drone of FIGS. 6A & 6B.

FIG. 6C illustrates the exemplary drone of FIGS. 6A & 6B as a replacement battery is connected to the drone of FIGS. 6A & 6B. FIG. 6C includes drone 605C that includes contacting mechanism/electromagnet 615C, wheels 620C, propulsion fans 620C, legs 625C, and battery 630C.

FIG. 6C also includes landing pad 660C that is concave in shape. The concave shape of landing pad 660C helps drone 610C center itself within landing pad 660C using gravity. As soon as a drone contacts landing surface 660C, the concave shape of landing surface 660C will cause drone 605C to roll or slide into place. As such, as soon as the wheels 620C of drone 605C contacts the concave portion of landing surface 660C, power to propulsion fans 660C may be limited or disconnected and gravity will allow drone 605B to be centered on landing surface 660C.

FIG. 6C also includes an apparatus that may be used to automatically swap battery 630C with battery 635C. Item 640C is a lever onto which battery 603C may be dropped by drone 605C. Pivot 645C allows lever 640C to rotate in a direction that directs battery 603C to be dropped into box 650C before battery 635C is placed into drone 605C by actuator stand 655C. Note that the arrow in FIG. 6C illustrates that battery 630C fallen into box 650C after rotation mechanism 645C has allowed contact lever 645C to rotate counter clockwise to a limiting point of revolution.

Note that battery actuator stand 655C has pushed battery 635C up toward contacting mechanism/electromagnet 615C. As mentioned in respect to FIG. 6A, a battery 635C may pass through a hole a landing surface 660C. This may be implemented using a powered actuator or alternatively actuator stand 655C may be spring loaded. Here again battery mechanical contact mechanisms may be used in conjunction with electromagnets. In other instances, battery retention mechanisms may be purely mechanical. Here again, an electromagnet may be initially used to grab battery 635B, and then another contact mechanism may physically interconnect with a physical contact point(s) at battery 635B.

As such, FIGS. 6A, 6B, & 6C illustrate a stop action view of one type of an automated battery replacement mechanism of the present disclosure. In certain instances sensors may be coupled to the lever mechanisms described above. These sensors may sense the position of batteries, a position of rotation of a lever mechanism, or the presence of a battery in a battery drop box. As such, the deployment of actuator stand 655C may be controlled by a processor coupled to a sensor. Alternatively, an actuator stand may be triggered by a battery actuating a lever (not depicted) in box 650C.

Figure 7A:
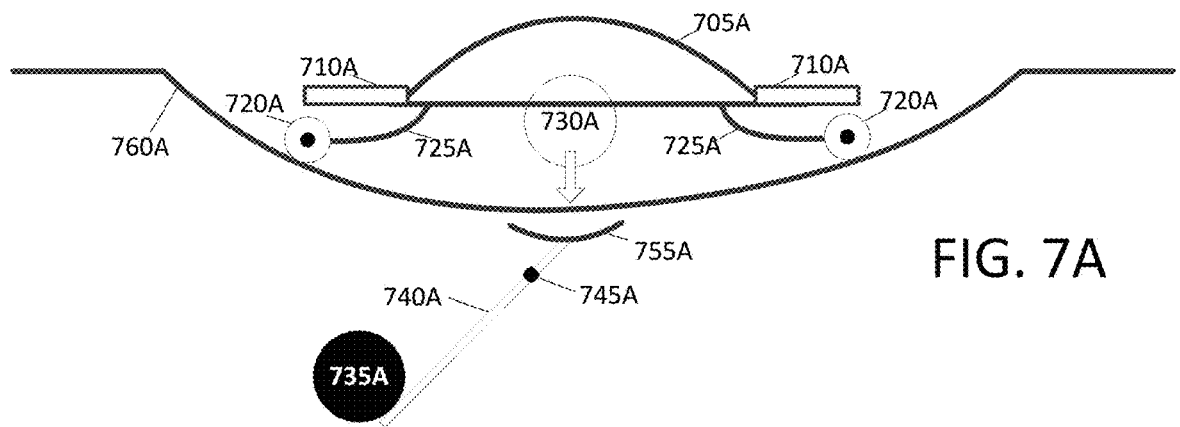
FIG. 7A illustrates an exemplary drone dropping a nearly exhausted battery just before a new battery is inserted into the drone.

FIG. 7A illustrates an exemplary drone dropping a nearly exhausted battery just before a new battery is inserted into the drone. FIG. 7A includes drone 705A that, wheels 720B, propulsion fans 720A, legs 725A, and battery 730A.

FIG. 7A also includes landing pad 760A that is concave in shape. The concave shape of landing pad 760A helps drone 710A center itself within landing pad 760A using gravity. As soon as a drone contacts landing surface 760A, the concave shape of landing surface 760A will cause drone 705A to roll or slide into place. As such, as soon as the wheels 720A of drone 705A contacts the concave portion of landing surface 760A, power to propulsion fans 760A may be limited or disconnected and gravity will allow drone 705A to be centered on landing surface 760A.

FIG. 7A also includes an apparatus that may be used to automatically swap battery 730A with battery 735A. Item 740A is a lever onto which battery 703A may be dropped by drone 705A. Pivot 745A allows lever 740A to rotate before battery 735A is placed into drone 705A by rotating lever 740A. Note that the arrow in FIG. 7A illustrates that battery 730A is moving toward landing surface 760A after being dropped by drone 705A. Landing surface may include a hole through which battery 730A is dropped onto lever grasping member 755A.

Drone 705A may drop battery 730A by releasing one or more mechanisms. For example, an actuator may release a pin or hook (i.e. a contact mechanism) that holds a battery or disconnect power to an electromagnet holding the battery such that the battery may be released. Mechanical holding mechanisms may be used in conjunction with electromagnets to grab and secure a battery consistent with the present disclosure. For example, an electromagnet may be initially used to grab a battery, and then another contact mechanism may physically interconnect with a physical contact point(s) at a battery.

Figure 7B:
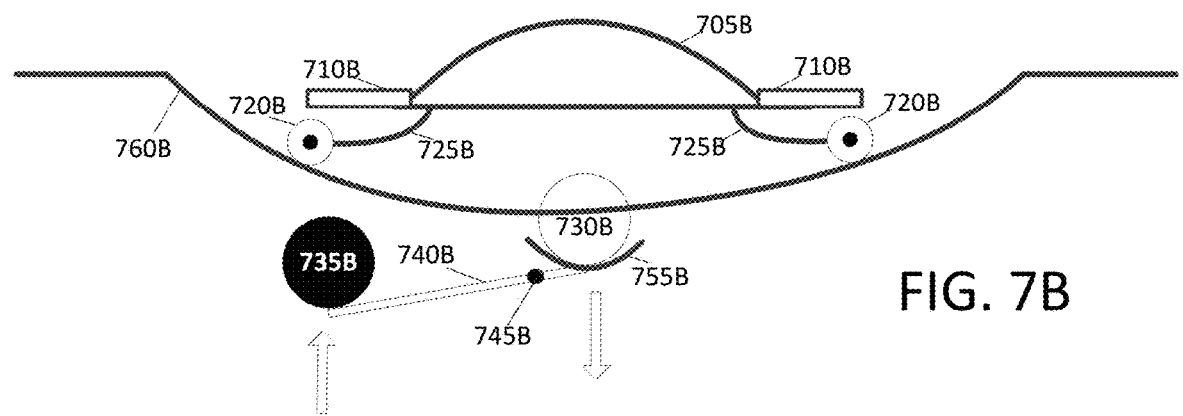
FIG. 7B illustrates the exemplary drone of FIG. 7A as the nearly exhausted battery falls through a hole associated with a landing pad.

FIG. 7B illustrates the exemplary drone of FIG. 7A as the nearly exhausted battery falls through a hole associated with a landing pad. FIG. 7B includes drone 705B that includes contacting mechanism/electromagnet 715B, wheels 720B, propulsion fans 720B, legs 725B, and battery 730B.

FIG. 7B also includes landing pad 760B that is concave in shape. The concave shape of landing pad 760B helps drone 710B center itself within landing pad 760B using gravity. As soon as a drone contacts landing surface 760B, the concave shape of landing surface 760B will cause drone 705B to roll or slide into place. As such, as soon as the wheels 720B of drone 705B contacts the concave portion of landing surface 760B, power to propulsion fans 760B may be limited or disconnected and gravity will allow drone 705B to be centered on landing surface 760B.

FIG. 7B also includes an apparatus that may be used to automatically swap battery 730B with battery 735B. Item 740B is a lever onto which battery 703B may be dropped by drone 705B. Pivot 745B allows lever 740B to rotate in a direction that directs battery 703A to be dropped into box 750B before battery 735B is placed into drone 705B by grasping member 755B.

Note that lever 740B may begin rotating as soon as battery 730B contacts grasping member 755B. This is true even when lever 740B appears to have leverage working against it: Since battery 735B is located further from pivot 745B that batter 730B one might be led to believe that leverage could work against the apparatus of FIG. 7B. When, however the mass of lever 740B plus the mass of battery 703B is greater than the leveraged mass of battery 735B, lever 735B may rotate clockwise after battery 740B contacts grasping member 755B. Here again, a lever (such as lever 740B) may be mechanically driven (i.e. be mass loaded or spring-loaded) or be driven by a powered actuator that causes lever 740B to rotate after battery 730B contacts grasping member 755B.

Here again drone 705B may drop battery 730B by releasing or more mechanisms. For example, an actuator may release a pin or hook contacting mechanism that holds a battery, or power to an electromagnet holding the battery may be used to release a battery. Here again battery mechanical contact mechanisms may be used in conjunction with electromagnets.

Figure 7C:
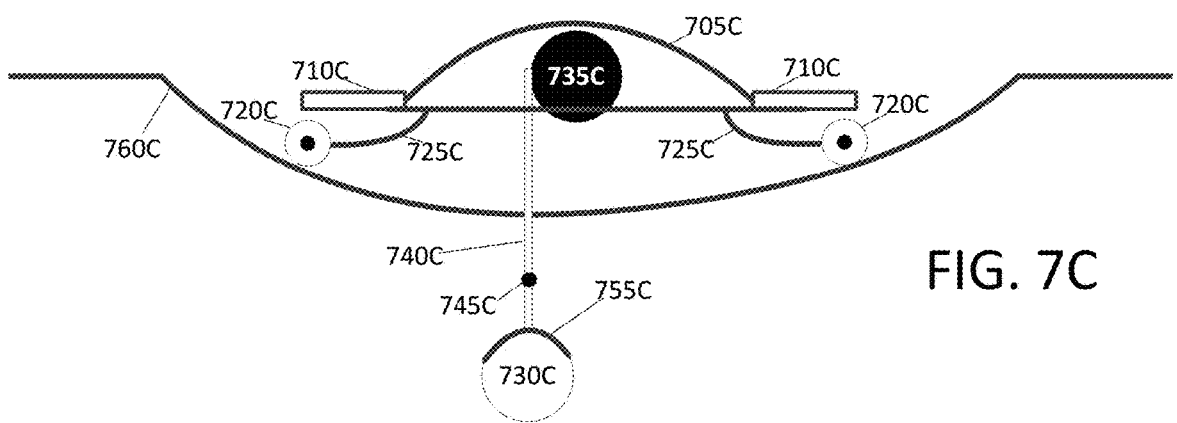
FIG. 7C illustrates the exemplary drone of FIGS. 7A & 7B as a replacement battery is connected to the drone of FIGS. 7A & 7B.

FIG. 7C illustrates the exemplary drone of FIGS. 7A & 7B as a replacement battery is connected to the drone of FIGS. 7A & 7B. FIG. 7C includes drone 705C that includes wheels 720C, propulsion fans 720C, legs 725C, and battery 730C.

FIG. 7C also includes landing pad 760C that is concave in shape. The concave shape of landing pad 760C helps drone 710C center itself within landing pad 760C using gravity. As soon as a drone contacts landing surface 760C, the concave shape of landing surface 760C will cause drone 705C to roll or slide into place. As such, as soon as the wheels 720C of drone 705C contacts the concave portion of landing surface 760C, power to propulsion fans 760C may be limited or disconnected and gravity will allow drone 705B to be centered on landing surface 760C.

FIG. 7C also includes an apparatus that may be used to automatically swap battery 730C with battery 735C. Item 740C is a lever onto which battery 703C may be dropped by drone 705C. Pivot 745C allows lever 740C to rotate in a direction that directs rotational movement of battery 735C into drone 705C by lever 740C and pivot 745C. Note battery 735C rotates into drone 705C as battery 730C falls to a downward position.

As mentioned in respect to FIG. 7A, a battery 735C may pass through a hole a landing surface 760C. Such a hold may be large enough to allow battery 735B and lever 740C to move through landing surface 760C during a battery replacement operation. This may be implemented using a powered actuator or alternatively lever 740B may be spring loaded. Here again, battery contact mechanisms may be used in conjunction with electromagnets or such a rotational apparatus that uses mechanical parts. Here again, an electromagnet may be initially used to grab battery 735B and then another contact mechanism may physically interconnect with a physical contact point(s) at battery 735B.

As such, FIGS. 7A, 7B, & 7C illustrate a stop action view of one type of an automated battery replacement mechanism of the present disclosure. In certain instances sensors may be coupled to the lever mechanisms described above. These sensors may sense the position of batteries, or a position of rotation of a lever mechanism. As such, the deployment of a rotation of lever 740C may be controlled by a processor coupled to a sensor.

Figure 8:
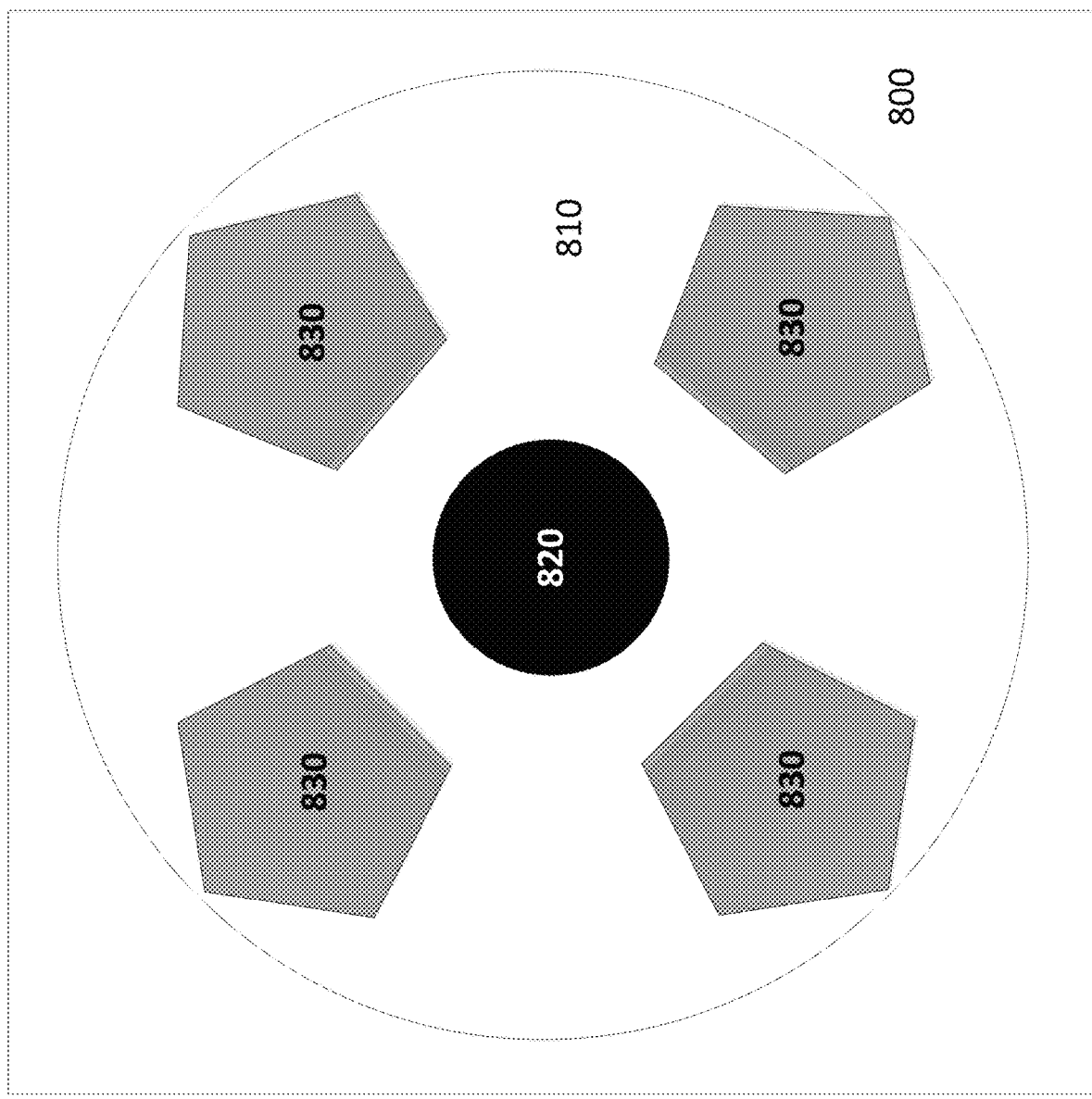
FIG. 8 illustrates an exemplary landing surface on which a drone may land.

FIG. 8 illustrates an exemplary lading surface on which a drone may land. Landing surface 800 includes round portion 810, a center portion 820, and chevron shapes 830. Round portion 810 of landing surface 800 may be concave like the landing surfaces illustrated in respect to FIGS. 6A, 6B, 6C, 7A, 7B, and 7C, or be of another shape (flat, for example). Chevron shapes 830 may be used by a drone or drone operator to identify the location of landing surface 800. As such, an operator using virtual reality goggles may use chevron shapes 830 when landing a drone. Alternatively a software program executed by a processor at a drone may use machine vision to identify chevron shapes 830 when landing automatically under program control.

Center portion 820 may also be a reference point used to help a drone land itself or give visual reference to an operator when an operator is piloting a drone. Center portion 820 may be a hole in landing platform 800 through which predominantly exhausted batteries are dropped or through which replacement batteries are provided to a drone. In certain instances, center portion 820 may include slots that allow batteries and portions of mechanical apparatus to pass through landing surface 800 from a place that is below landing surface 800.

Chevrons 830 may be of any shape or size, they may also include electrical contacts through which electrical power is passed to a drone.

Figure 9:
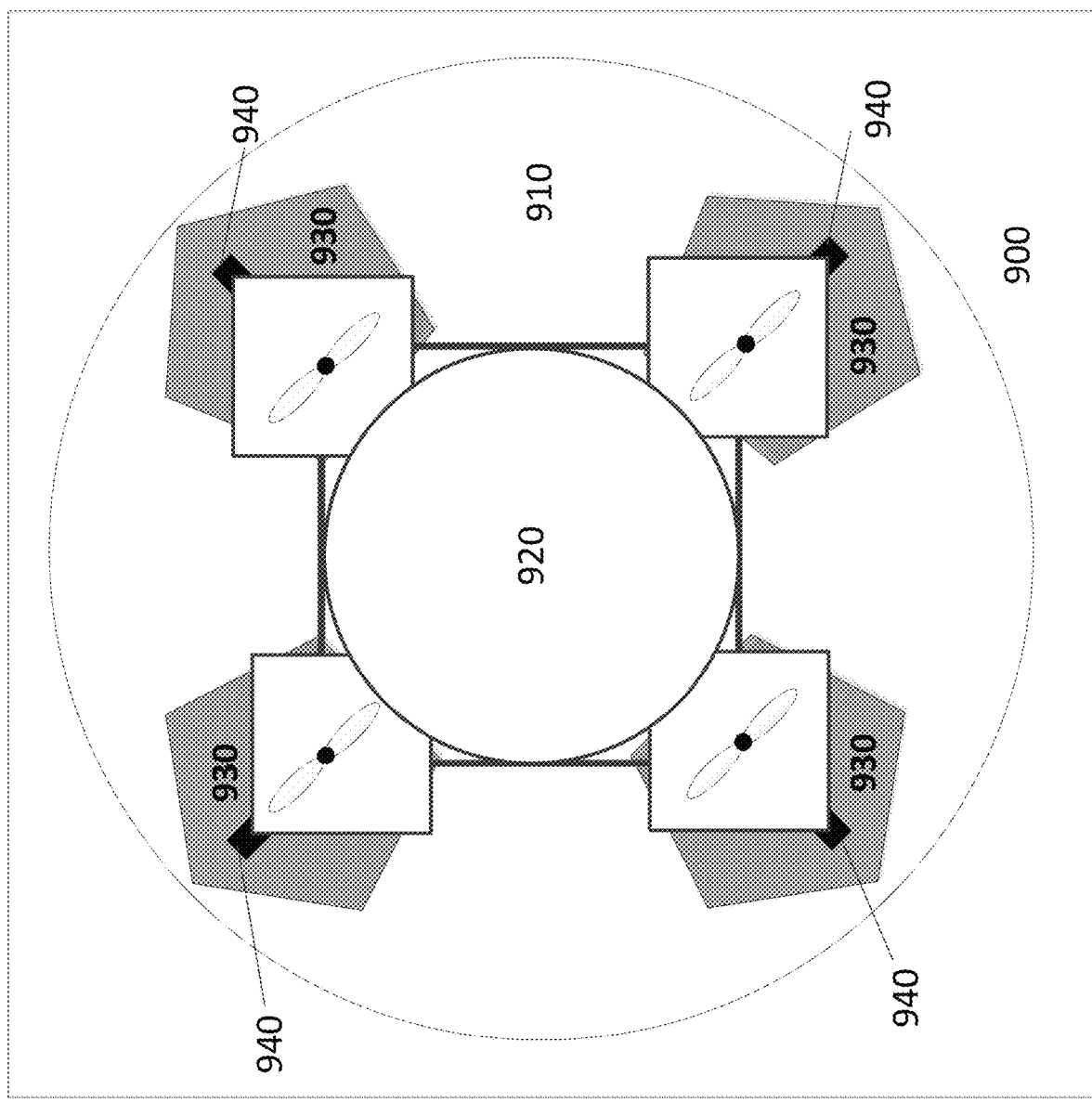
FIG. 9 illustrates an exemplary landing surface upon which a drone is positioned.

FIG. 9 illustrates an exemplary landing surface upon which a drone is positioned. Landing surface 900 of FIG. 9 includes round portion 910 and chevrons 930. Notice that drone 920 has landed on landing surface 910 and that contacts 940 are touching chevrons 930. When chevrons 930 are connected to an electrical power source and when contacts 940 are electrical contacts, drone 920 may receive electrical power directly from landing surface 900. This may be true when contacts 940 include conductive contacts or when contacts include conductive contacts attached to landing wheels. As such, even when a battery is being swapped as illustrated in other figures of this disclosure, power may be provided to the drone. Power provided to the drone may be used to charge super-capacitors or batteries of drone 920 even when a primary battery is not installed in a drone. As such, landing surface 900 may include various innovative features that improve landing accuracy, the help self-align a drone, provide power dynamically to a drone, and that automatically swaps a battery of a drone.

In other instances, chevrons 930 may include a coil of wire that provides electromagnetic energy to features at drone 920 via transformer action. As such, contacts 930 may also include a coil of wire that receives electromagnetic energy from chevrons 930.

Figure 10:
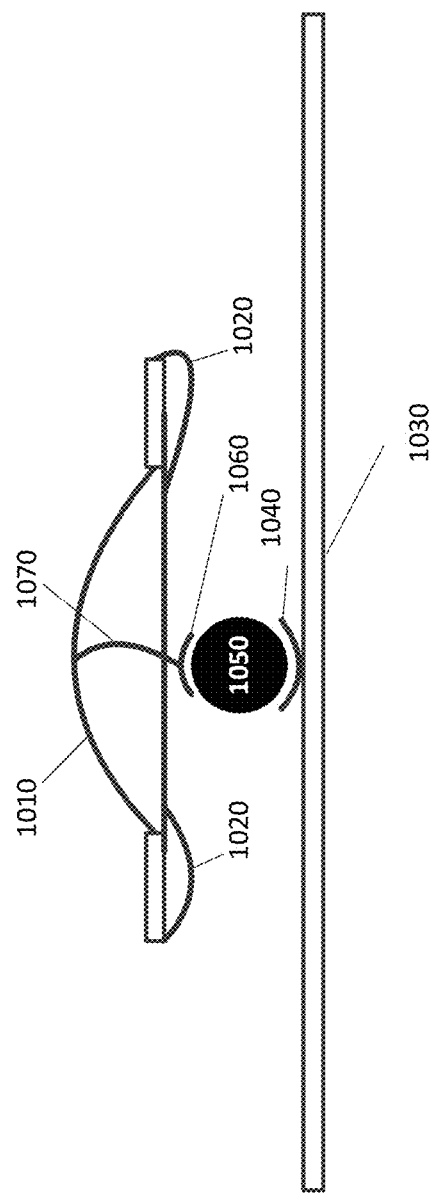
FIG. 10 illustrates an exemplary drone picking up a fresh battery without landing.

FIG. 10 illustrates an exemplary drone picking up a fresh battery without landing. In such an instance drone 1010 may hover over surface 1020, battery holder 1040, and battery 1050 as battery 1050 is picked up by drone 1010. Drone 1010 includes connection mechanism 1060, connecting member 1070, and landing skids 1020. In one example, connection mechanism 1060 includes an electromagnet that grabs battery 1050. Here again connection mechanism may include mechanical members that grab onto battery 1050. Connection mechanism 1070 may be ridged, semi-ridged, or may be a cable. When connection mechanism 1070 is cable or is mechanically actuated, for example, connection mechanism 1060 may be lowered into a position where it can grab battery 1050. Then after battery 1050 has been grabbed, it may be pulled inside of drone 1010 via connection mechanism 1070.

Landing skids 1020 may also be configured as electrical power contacts that may deliver electrical power from surface 1030 through the chevrons of FIGS. 8 and 9. These skids may also allow drone 1010 to slide when on a concave surface, such that drone 1010 may be gravity located on such a concave surface.

Figure 11:
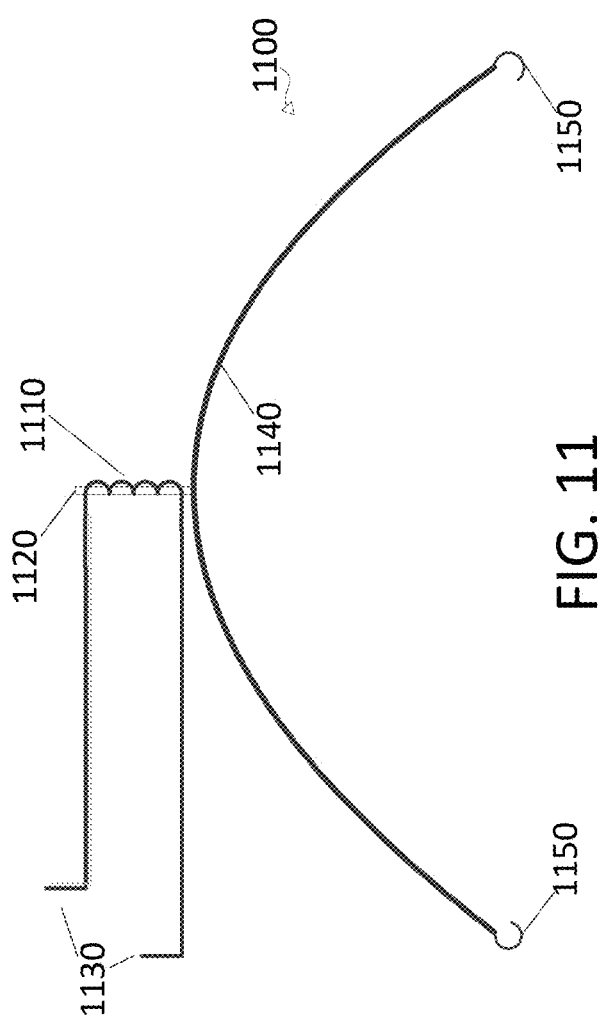
FIG. 11 illustrates exemplary electro-magnet and mechanical grasping mechanisms that may be used according to the present disclosure.

FIG. 11 illustrates exemplary electromagnetic and mechanical grasping mechanisms that may be used according to the present disclosure. FIG. 11 includes grasping apparatus 1100 that includes electro magnet 1110, coupling assembly 1140, and hooks 1150. Electromagnet 1110 includes wires 1103 that coil around a core 1120. When electrical current is applied through wires 1130 and electromagnet 1110 magnetic fields surrounding wire 1130 are concentrated into core 1120 creating an electromagnet that may be used to contact or grab a battery. Coupling assembly 1140 supports hooks 1150 that may be used to grab onto features (not illustrated) of a battery. Note that in certain instances, hooks 1150 may straighten or deploy when a bi-metallic strip is heated. In such an instance hooks 1150 may include or be comprised of a bi-metallic strip that actuates to grab a battery. Such a bi-metallic strip may be actuated by passing an electrical current through contacts at the bi-metallic strip.

Figure 12A:
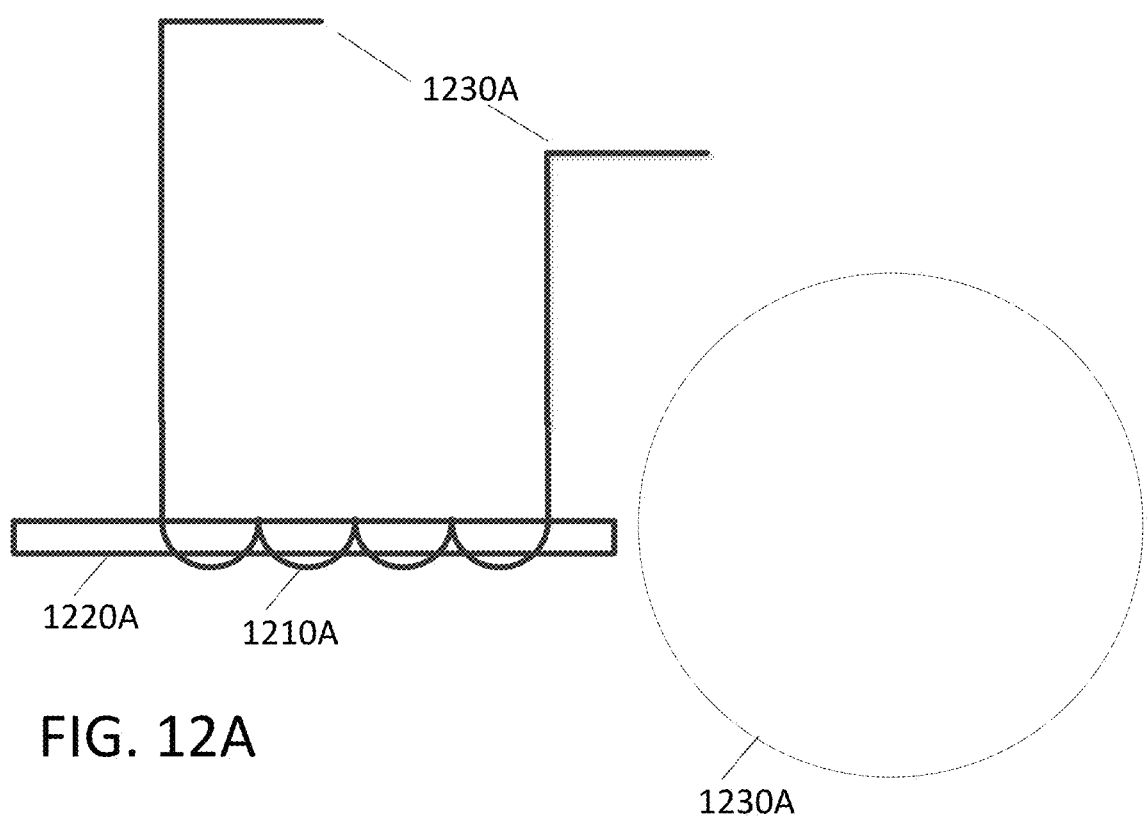
FIG. 12A illustrates an exemplary actuator consistent with grabbing a battery.

FIG. 12A illustrates an exemplary actuator consistent with grabbing a battery. Actuator 1210A includes wires 1230A that wrap around actuating mechanism 1220A. Electrical current passing through wires 1230A may cause actuating member in actuator 1220A to move. FIG. 12A also includes spherical battery 1240A.

Figure 12B:
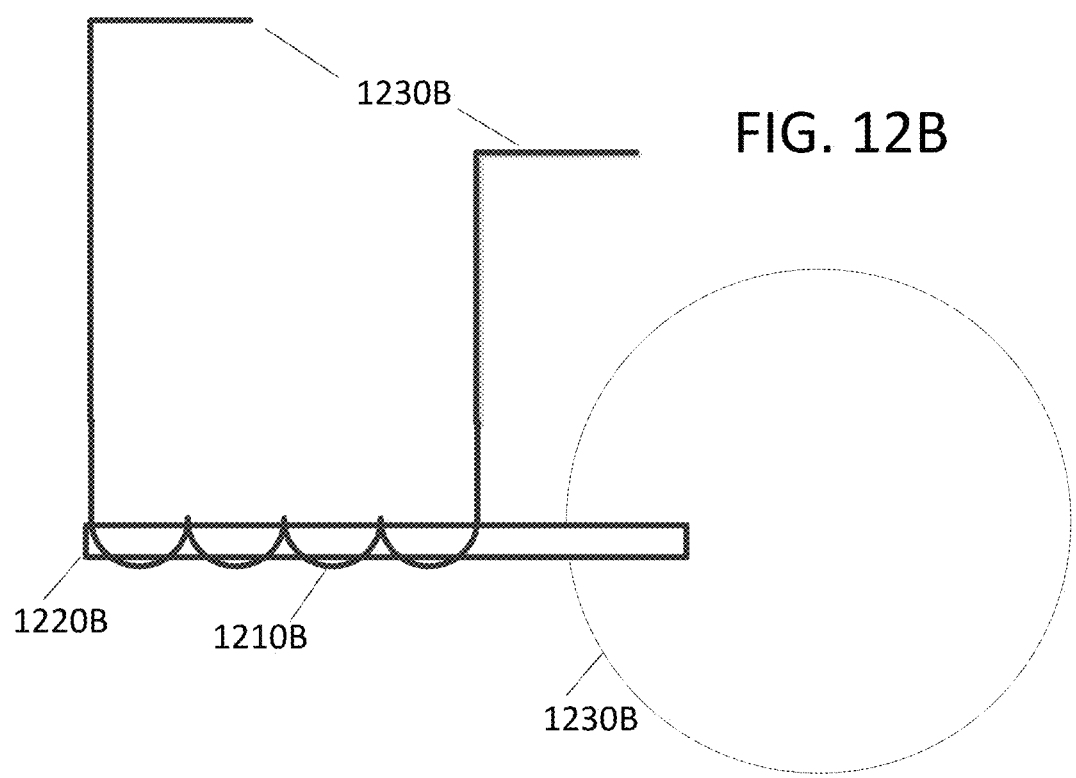
FIG. 12B illustrates the exemplary actuator of FIG. 12A as the exemplary actuator of FIG. 12A engages the battery of FIG. 12A.

FIG. 12B illustrates the exemplary actuator of FIG. 12A as the exemplary actuator of FIG. 12A engages the battery of FIG. 12A. Actuator 1210B includes wires 1230B that wrap around actuating mechanism 1220B. Electrical current passing through wires 1230B may cause actuating member in actuator 1220B to move. FIG. 12B also includes spherical battery 1240B.

Note that FIG. 12B illustrates actuator 1220B retaining battery 1240B like a pin in a hole. Such an actuator may be configured to hold a battery or release a battery, simply by moving the actuator from one position to another by changing the direction of a current through wires (i.e. wires 1230A/1230B).

While batteries with a spherical shape have been disclosed in the FIGURES of this disclosure and in the written description of this disclosure, the presently disclosed invention is not limited to using batteries with a spherical shape. As batteries of other shapes may be used, including yet not limited to: cylindrical, conical, square, rectangular, and circular shapes of various dimensions. Systems and methods consistent with the present disclosure may also include multiple primary batteries that may be swapped in a manner consistent with the present disclosure.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

The invention claimed is:

1. A system for picking a battery by an unmanned aerial vehicle, the system comprising:
   an unmanned aircraft that carries a battery via one or more mechanisms that couple a first battery to the unmanned aircraft, wherein:
   at least one attachment mechanism of the one or more mechanisms includes an electro-magnet that couples the first battery and controllably secures the first battery to the aircraft,
   the aircraft approaches a location associated with a replacement battery,
   the electro-magnet physically releases the first battery, the electro-magnet contacts and grabs the replacement battery by magnetically attaching a magnet at the replacement batter to the electro-magnet, and the replacement battery is secured to the aircraft by the electro-magnet.

2. The system of claim 1, wherein the first battery and the replacement battery include a near field data communications interface.

3. The system of claim 1, wherein the first battery and the replacement battery have a spherical shape.

4. The system of claim 1, wherein the location associated with the replacement battery includes a concave shape.

5. The system of claim 1, wherein the location associated with the replacement battery also includes an assembly that receives the first battery that the first battery drops into after the first battery has been released from the aircraft.

6. The system of claim 1, wherein the location associated with the replacement battery includes an actuator that actuates to move the replacement battery close to the electro-magnet.

7. The system of claim 1, wherein the electro-magnet further includes a mechanical fastener.

8. The system of claim 7, wherein the mechanical fastener includes a bi-metallic actuator that grabs a feature at the battery.

9. The system of claim 1, further comprising one or more shapes used by the unmanned aerial vehicle to identify the location of a landing surface located at the location associated with the replacement battery.

10. The system of claim 9, wherein the one or more shapes include electrical contacts that contact electrical contacts at the aircraft when the aircraft is positioned in an orientation over the one or more shapes such that power is conducted to the aircraft via the one or more shapes.

11. The system of claim 9, wherein the one or more shapes provide a visual identifier that identify the location of the replacement battery.

12. The system of claim 11, wherein the one or more shapes are identified by an automated flight control system at the aircraft.

13. The system of claim 12, wherein the one or more shapes are identified by a user of the aircraft via a display.

14. A method for picking a battery by an unmanned aerial vehicle, the method comprising:

allowing an unmanned aircraft to approach a location associated with a replacement battery;

releasing an electro-magnet, wherein the releasing of the electro-magnet causes the first battery to drop away from the unmanned aircraft;

contacting the replacement battery with the electro-magnet, wherein the electro-magnet grabs the replacement battery by magnetically attaching a magnet on the battery to the electro-magnet; and automatically securing the replacement battery with the electro-magnet.

15. The method of claim 14, wherein the first battery and the replacement battery include a near field data communications interface that identifies the first battery and the replacement battery.

16. A non-transitory computer readable storage medium having embodied thereon a program executable by a processor located on an unmanned aircraft to instruct the unmanned aircraft to perform a method for picking up a battery, the method comprising:

allowing the unmanned aircraft to approach a location associated with a replacement battery;

releasing an electro-magnet, wherein the releasing of the electro-magnet cause the first battery to drop away from the unmanned aircraft;

contacting the replacement battery with the electro-magnet, wherein the electro-magnet grabs the replacement battery by magnetically attaching a magnet on the battery to the electro-magnet; and automatically securing the replacement battery with the electro-magnet.

* * * * *